3,410,678
**WAX-OIL EMULSION FOR REGULATING
PLANT TRANSPIRATION**
Edward L. Ratledge, Claymont Heights, Del., assignor to Sun Oil Company, Philadelphia, Pa., a corporation of New Jersey
No Drawing. Filed July 6, 1965, Ser. No. 469,870
3 Claims. (Cl. 71—127)

ABSTRACT OF THE DISCLOSURE

An antitranspirant composition and method of application to foliar parts of growing plants comprising a wax-oil in water emulsion containing 0.125 to 4.875 parts per hundred parts of water of petroleum wax having a melting point in the range of 122°–160° F. and 0.125 to 4.875 parts per hundred parts of water of a petroleum hydrocarbon oil having a maximum of 8.0 wt. percent gel aromatics and a distillation range at 10 mm. Hg abs. of 300°–500° F.

---

This invention relates to improved methods and compositions for stimulating plant growth. This invention particularly relates to compositions of emulsified wax and oil which are effective in stimulating plant growth by regulation of plant transpiration.

It is generally known that growing plants are continually losing water by a process known as transpiration. It is not generally realized, however, that the loss of water is very large and often constitutes a serious danger to the well-being of the plant. Most of the water which is taken in by the roots and carried up the vascular tissues is lost into the air. Microscopic examination of the structure of a leaf shows why this occurs. The cells of the mesophyll (the green parenchyma between the epidermal layers of a foliage leaf) are in contact with air over much of their total surface. The cell walls of the mesophyll are moist, and the water in them evaporates into the air just as water in any sort of sponge or open container evaporates if it is in contact with air. As the walls begin to dry out, more water diffuses into them or is imbibed by them from the water within the plant.

The amount of transpiration under average conditions is surprisingly large. A sunflower may transpire 276 grams of water per square meter of leaf surface per hour. A single corn plant may transpire as much as fifty gallons of water in a growing season and a field of corn enough water to cover with seven inches of water on the ground on which it grows. A single date palm transpires 100 to 190 gallons of water per day. This water is, of course, absorbed from the soil in which the plant grows.

Water evaporates from a plant for the same reasons and in much the same manner as it evaporates from an open dish or from a wet cloth. However, the rate of transportation is not constant. It is most rapid in high temperature, strong wind, bright light, and low humidity, that combination of factors which most favors evaporation. If any one of these factors varies, the rate of transpiration varies accordingly.

Different plants vary greatly in the rates at which they transpire. Plants with thick, heavily cutinized leaves and relatively few stomata and air spaces (such as pines) transpire less rapidly than those with delicate leaves well provided with stomata and containing large air spaces. In fact, the ability of certain plants to live in very dry regions is dependent partly on their relatively slow transpiration.

If the leaves transpire more rapidly than the roots absorb water or the stem conducts it, then the water content of the plant decreases. Such a decrease in water content first causes the growth of the plant to stop; and if it is continued, the plant wilts. Efforts are made, therefore, by growers of plants to prevent such results, either by adding water to the soil or by reducing transpiration. The transpiration from a plant may be reduced by removing some of the leaves; this is frequently done during transplanting, when the absorptive system (root system) has been partly destroyed in handling the plants. The same result is accomplished by plants by the shedding of leaves during a prolonged drought. Transpiration may be reduced also by shading the plant, as is accomplished by white-washing greenhouses in the summer, by increasing the humidity of the air surrounding the plant, by lowering the temperature, or by protecting the plant from the wind (as is done, for example, in orchards, by wind breaks).

The U.S. Department of Agriculture recently conducted a study of plant transpiration and published its findings in Production Research Report Number 87, entitled "Research in Plant Transpiration: 1962." The report states on pages 42 and 51:

Several (antitranspirant) compounds are presently marketed by commercial companies. These compounds, which are latexes, waxes, and plastics, are generally applied in foliar sprays or dips. Some are widely used by horticulturists for reducing transpiration of transplants, bulbs, and Christmas trees. High costs of these compounds prevent extensive use in the fields of forestry and agronomy. There is also a paucity of published information on the efficiency of the compounds as antitranspirants. For this reason it was deemed necessary to evaluate them as potential transpiration suppressants.

Specific information pertinent to each compound tested was supplied by the manufacturer and is included in the appendix. These materials were tested at the manufacturer's recommended rate of dilution on beans, Phaseolus vulgaris L. variety red kidney, and on corn, Zea mays variety Dixie 82. These plants grow and transpire rapidly; therefore, they are excellent for evaluation studies. Transpiration before and after spraying was obtained by weight differences. (Page 42.)

Compounds evaluated as transpiration suppressants included several latex and plastic compounds, waxes, mercury and fluoride compounds, and α-hydroxysulfonates. Most of them did not reduce transpiration without also depressing plant growth. In some cases temperature of treated leaves was elevated to the "kill point" when the plants were placed under high light. (Page 51.)

All of the above clearly points out the continuing and ever present problem of crop damage due to excessive water losses by growing plants during droughts or prolonged dry spells. As can be seen in the excerpts from the United States Department of Agriculture report, the problem of sustaining plant growth by regulation of transpiration without retarding or damaging the plant treated still exists.

This problem has now been alleviated by the compositions and methods of the present invention. By the present invention plant transpiration is favorably regulated without hindering plant growth by controlled applications of specific wax-oil emulsion compositions.

It is recognized that waxes and oils alone or in combination have previously been utilized in the treatment of some plants. For example, U.S. Patent 1,875,473 teaches stimulating growth of plants by subjecting the plants to vapors of shale oil in a controlled environment. This method may be effective in controlled environments such as a greenhouse; however, no large scale application of this process is practicable.

U.S. Patent 2,284,970 relates to a method for regulating the abscisson layer in growing plants by treatment with an auxin and more especially to a carrier for the auxin which upon drying will form a protective coating so as to insure that the auxin will be absorbed by the plant.

The carrier disclosed in this patent consists of an emulsion containing from 23 to 40 parts wax or wax and oil per 47 to 71 parts of water. The plant treatment consists of coating said plant with the carrier containing an auxin, at a time prior to that at which abscisson of plant leaves takes place. The object of using the wax-oil emulsion as a carrier for the auxin is to provide a flexible water soluble coating on the plant which protects the auxin and enables the plant to absorb the auxin at a constant and continuous rate until the supply of auxin is exhausted. Although apparently effective for its intended purpose, it can be readily recognized that the carrier compositions disclosed in this patent do not provide, nor were intended to provide a means of regulating plant transpiration.

U.S. Patent 3,129,529 relates a method of regulating the time at which blossoms form on fruit trees. The process involves coating trees with low melting point wax to inhibit early blossoming and subsequent late frost damage to trees. The two critical elements of this invention are the tree must be coated with the protective coating compositions prior to budding and the melting point of wax used to coat the trees must melt within a temperature range which is normally conducive to plant growth in order to be effective; that is, within the range of 70°–120° F.

As is disclosed above wax and/or oil coatings have been previously used to achieve various favorable reactions in plant culturing. However, until now no effective method of stimulating plant growth by the regulation of plant transpiration has been discovered. I have now discovered compositions and methods to achieve this goal.

It is an object of this invention to provide a new and improved process for promoting plant growth involving compositions and specific methods of application of plant growth-promoting compositions.

It is another object of this invention to protect growing plants from damage due to excessive transpiration during periods of drought or unusually prolonged dry spells.

These and other objects of this invention will become apparent as the detailed description of the invention proceeds.

As described above transpiration takes place from two specific areas of foliar plants; that is, the cuticle and the stomata of the leaves.

Through the layer of cuticle forming the surface of all mature leaves some water escapes into the air. This loss of water through the cuticle is spoken of as cuticular transpiration, to distinguish it from water loss through the stomata which is called stomata transpiration. The principal means by which plants reduce cuticular transpiration is the thickening of the outer wall of the epidermal cells, the presence of large quantities of the wax-like material, cutin, in this wall, and the production of close-set rods of wax (the so-called "bloom") which occurs on many friuts, leaves, and stems and which has the appearance of a very fine powder.

Plants which grow in arid or semi-arid regions normally have some degree of the above-described transpiration control mechanism built into their foliage. However, plants such as ornamentals or vegetables which normally grow in areas of plentiful rainfall do not normally contain this protective mechanism to any significant degree. Therefore, when these plants are subject to unusual or prolonged dry spells, or are transplanted into a dry area, severe damage with the resulting losses of these valuable crops often occurs.

As disclosed above the United States Department of Agriculture has been working in this area but as the report discloses, no effective method of relieving this problem has been discovered.

I have now discovered compositions and methods which most nearly reproduce the anti-transpirational mechanisms found in plants adapted to moisture-poor or arid environments. By the methods of the present invention any foliar plant can be protected during the growing season against damaging water losses due to excessive transpiration during prolonged dry spells. This protection is achieved without inhibiting plant growth and in effect the methods of the present invention promote the growth and the fruit or vegetable production of that plant.

It has been discovered that by controlled applications at specific time intervals of specific wax-oil emulsion to the plants to be treated, an anti-transpirational protective mechanism is achieved in plants which are not inherently endowed therewith.

Plant transpiration regulation by use of the compositions of the present invention can comprise a single application of the wax-oil emulsion, or a specifically timed series of applications. By either method the wax-oil concentration in the plant treating composition applied is an important facet of the present invention.

The compositions of the present invention are comprised of dilute emulsions of specific concentrations and ratios of petroleum wax and specific petroleum hydrocarbon oils in water. Petroleum waxes usable in the compositions of the present invention have a melting point in the range of 122° to 160° F. Petroleum waxes are primarily crystalline and amorphous paraffin waxes which are obtained from well known dewaxing procedures from waxy lubricating oils such as by solvent dewaxing with a methyl ethyl ketone-toluene mixture, methyl isobutyl ketones, propane, and the like. The precipitated wax crystals are removed by centrifuging or filtering to form slack wax. Slack wax usually contains up to 20 weight percent oil and can be further purified to form scale wax and refined wax which normally contains less than 0.5 weight percent oil. These waxes are well known articles of commerce.

The petroleum hydrocarbon oil component of the compositions of the present invention preferably is a solvent refined fraction of petroleum oil composed primarily of paraffinic and naphthenic hydrocarbons and containing less than 8 weight percent of aromatics. This petroleum oil fraction is characterized as follows:

| | |
|---|---:|
| Gravity, ° API/60° F. | 31.0–36.0 |
| Viscosity, SUS/100° F. | 60–120 |
| Viscosity, SUS/210° F. | 34–38 |
| Flash point, ° F. | 300–400 |
| Fire point, ° F. | 375–400 |
| Pour temperature, ° F. | −10 to +20 |
| Unsulfonated residue, wt. percent (ASTM) | 92.0–99.9 |
| Refractive index, 25° C. | 1.4660–1.4690 |
| Gel aromatics, wt. percent, max. | 8.0 |
| Distillation range at 10 mm. Hg (ASTM D–1160), ° F. | 300–500 |

Two particularly important elements of the present invention are the melting range of the wax used and the composition of the petroleum hydrocarbon oil which is used. First it is important that the thin film deposited on the surface of the plants treated according to the methods of the present invention maintain its film like characteristics during the time of transpiration regulation on the plant. If the melting point of the wax used in the coating is too low, the wax can become liquid at temperatures favorable to plant growth which happening removes the transpiration regulation qualities from the film coating which renders said coating ineffective for its intended purpose. Also this resulting liquid from the melted wax under some circumstances can penetrate the cuticle of the leaf and interrupt the normal metabolic processes of the plant. Therefore it is critical that the melting point of the wax used in the compositions of the present invention be no lower than 122° F.

The above-disclosed chemical and physical characteristics are critical factors in the compositions of the present invention.

The compositions of the present invention are wax-oil in water emulsions. Ionic or non-ionic surface active compounds can be employed as emulsifying agents.

Surface active agents are suitable as a class for use according to the present invention. The nature of surface active agents is well known, and such agents generally have an oleophilic portion of the molecule, usually of hydrocarbon nature, and another, polar portion of the molecule, which may be provided by various functional groups such a hydroxyl, sulfate, carboxyl, carbonyl, amino, nitro, amido, ether, sulfonate, phosphate, phosphite, etc. Examples of suitable classes of surface active agents which can be employed are: alkali metal salts of fatty acids, alkali metal salts of sulfated fatty acids, fatty acid glycerides, sulfonated or sulfated fatty acid esters or amides, alkali metal alkyl sulfates, alkali metal alkyl sulfonates, alkali metal aryl sulfonates, alkali metal alkyl-lauryl sulfonates, quaternary ammonium halides, alkali metal salts of alkylated naphthalene, sulfonic acid, polyethylene sorbitol esters of fatty acids, fatty acid amides of alkanol amines, condensation products of ethylene oxide and polyalkylene glycols, sorbitan esters, alkyl substituted phosphoric acids, alkali metal salts of alkyl phenol sulfonates, etc. Examples of individual surface active agents which can be employed are given for example in Kirk et al., Encyclopedia of Chemical Technology, vol. 13, pages 515–517 (1954).

Particularly suitable surface active agents for use according to the invention are the polyalkyl amines and fatty acid amides, of which numerous examples are given in the Kirk et al. disclosure referred to in the preceding paragraph.

The compositions of the present invention are normally prepared as an emulsion concentrate which can then be diluted to the desired amount of wax and oil in water just prior to application. The concentration of wax and oil in water of the final coating product is a critical part of the present invention. If the concentration of wax and oil is too high in the coating emulsion at the time of application, the detrimental effects noted in the United States Department of Agriculture Report cited supra can prevail. Therefore it is an essential and critical part of the present invention that the final concentration of wax and oil in coating emulsion for plant application be no greater than a total of 5.0 parts of wax and oil in 100 parts of water. Plant growth stimulation can be realized by application of an emulsion coating composition containing as little as 0.25 part of wax and oil in 100 parts of water. However, the preferred concentration range of wax and oil in water as a plant treating emulsion is from one part wax and oil in 100 parts of water to 2.5 parts of wax and oil in 100 parts of water.

The ratio of wax to oil in the composition can vary from 1 part wax to 20 parts oil up to 20 parts of wax to 1 part oil according to the desired application. Therefore, the wax-oil coating emulsion of the present invention can contain 0.125 to 4.875 parts of wax per 100 parts of water and 0.125 to 4.875 parts of oil per 100 parts of water. However, the sum total of wax and oil in the final dilution of the emulsion composition for foliar application cannot exceed 5.0 parts per 100 parts of water for purposes of the present invention.

Each type of plant has individual requirements as to the total wax-oil concentration in the plant foliar treating emulsion as well as the ratio of wax to oil within that emulsion coating composition. For example, the leaf structure of a tomato plant is distinctly different from the leaf structure of a cucumber plant or a corn plant. As previously noted the leaf structure of the plant is an important factor in regulation of transpiration of that particular plant, so that the foliar treating emulsion formulation which most favorably stimulates plant growth for each type of plant should be selected in accordance with the requirements of that plant.

It has also been discovered that often when the more dilute concentrations of the emulsions of the present invention are applied to plants at predetermined time intervals during the growing season, plant growth is more favorably stimulated than when a single application of an emulsion having higher wax-oil concentrations is made.

Emulsifying agents used in the compositions of the present invention are normally in the range of 1 to 10 parts of emulsifying agent for every 100 parts of wax and oil in the final composition.

To illustrate one mode of the practice of the present invention the following example is given.

At a temperature of 160° F. 30 parts of petroleum paraffin wax having a melting point of 126° F. were blended with 30 parts of a petroleum oil fraction of the following characteristics:

| | |
|---|---|
| Gravity, ° API/60° F. | 34.6 |
| Viscosity, SUS/100° F. | 70.4 |
| Viscosity, SUS/210° F. | 36.5 |
| Flash point, ° F. | 355 |
| Fire point, ° F. | 395 |
| Pour temperature, ° F. | −5 |
| Unsulfonated residue, wt. percent | 95.3 |
| Refractive index, 25° C. | 1.4685 |
| Gel aromatics, wt. percent | 7.7 |
| Distillation range at 10 mm. Hg, ° F. | 356–475 |

To this blend were added 3.5 parts of polyoxyethylene (20) sorbitan monoolate which is commercially sold under the trade name "Tween 60" by Atlas Powder Company, 3.5 parts of sorbitan monostearate which is commercially sold under the trade name "Span 60" by Atlas Powder Company, and 40 parts of water which had been preheated to the temperature of the wax-oil blend. The resulting mixture was then agitated to produce a homogeneous stable wax-oil emulsion concentrate.

This concentrate was then diluted with water to a final composition of 0.5 part wax and oil to 100 parts water. Pepper plants which were being grown in sash beds and which had blossomed and started to bear fruit were transferred from the sash beds in which they were growing to open fields during the month of May, in an area which was experiencing a period of below normal rainfall. Approximately one acre of land was utilized for these pepper transplants which were planted 4 feet apart in 50 feet rows. One-half of the plants transplanted were sprayed with the plant growth stimulating composition in the amount of 100 gallons per acre.

Standard commercial agricultural spray apparatus was used in the present application and in general is suitable for the purposes of the present invention.

The plants of the other half of the acre were left untreated to serve as a control. Sixteen days after treatment all of the plants were harvested.

The plants of the untreated half of the acre yielded an average of 4 full grown peppers per 50-feet row of plants. The average weight of peppers harvested per 50-feet row of plants was 1.0 lb. The harvest from the plants of the treated half of the acre yielded an average of 18 full grown peppers per 50-feet row which peppers average 4.5 lbs. per 50-feet row of plants harvested. This fourfold increase of fruit yield in a given amount of time under identical growing conditions clearly demonstrates the plant growth stimulating effect of the process and compositions of the present invention. The above specific embodiment of the present invention is given to illustrate the present invention and is not intended as a limitation thereof.

The process and compositions of the present invention are applicable to all foliar plants including vegetables, trees, ornamentals, and grass.

Vegetable plants such as cucumbers, peppers, tomatoes, green beans, spinach, cabbage and others are included as plants that can be treated by the method of this invention. In general all dicidious and conferous trees such as oak, elm, maple, spruce, pine, and others are included as plants which can be treated according to the methods of the present invention. All grasses such as fescues, narrow blade and wide blade varieties as well as ornamentals such as flowers and evergreen bushes are included also as plants which can be treated according to the methods of the present invention.

By topical application is meant the act of coating foliar parts of the plants being treated. Topical application can be in the form of dipping, spraying, or any of the many well known methods of treating growing plants.

The amount of the plant growth composition that is needed to protect growing plants is determined by the method of application. When the foliar surfaces of the plants being treated are sufficiently wetted, the application is complete. The amount of treating emulsion necessary to coat an acre of growing plants is dependent upon the size and number of plants per acre in the area being treated, as well as the efficiency of the method being used. These variables are easily determined without excess experimentation.

Other additives which are known plant adjuvants may be included in the compositions of the present invention. These adjuvants include fungicides such as metal salts and organic complexes of metals; for example ferric dimethyldithiocarbonate, copper carbonate, copper 8-hydroxyquinoleate, copper oleate, copper 3-phenylsalicylate, n-dodecylquanidine acetate, and others.

The invention claimed is:

1. An anti-transpirant composition for topical application to foliar plants consisting essentially of an aqueous emulsion of 0.125 to 4.875 parts of petroleum wax having a melting point in the range of 122°–160° F. per 100 parts water and 0.125 to 4.875 parts of petroleum hydrocarbon characterized as having:

| | |
|---|---:|
| Gravity, ° API/60° F. | 31.0–36.0 |
| Viscosity, SUS/100° F. | 60–120 |
| Viscosity, SUS/210° F. | 34–38 |
| Flash point, ° F. | 300–400 |
| Fire point, ° F. | 375–400 |
| Pour temperature, ° F. | −10 to +20 |
| Unsulfonated residue, wt. percent | 92.0–99.9 |
| Refractive index, 25° C. | 1.4660–1.4609 |
| Gel aromatics, wt. percent, max. | 8.0 |
| Distillation range at 10 mm. Hg, ° F. | 300–500 | and an emulsifying agent, the total concentration of said wax and oil being in the range of 0.25 to 5.0 parts per 100 parts of water.

2. A composition according to claim 1 containing an adjuvant.

3. A method of reducing plant transpiration which comprises treating plant foliage with a wax-oil in water emulsion composition consisting essentially of 0.125 to 4.875 parts of petroleum wax having a melting point in the range of 122°–160° F. per 100 parts of water, 0.125 to 4.875 parts of a refined petroleum hydrocarbon oil characterized as having:

| | |
|---|---:|
| Gravity, ° API/60° F. | 31.0–36.0 |
| Viscosity, SUS/100° F. | 60–120 |
| Viscosity, SUS/210° F. | 34–38 |
| Flash point, ° F. | 300–400 |
| Fire point, ° F. | 375–400 |
| Pour temperature, ° F. | −10 to +20 |
| Unsulfonated residue, wt. percent | 92.0–99.9 |
| Refractive index, 25° C. | 1.4660–1.4690 |
| Gel aromatics, wt. percent, max. | 8.0 |
| Distillation range at 10 mm. Hg, ° F. | 300–500 | in 100 parts of water and an emulsifying agent, the total concentration of said wax and oil being in the range of 0.25 to 5.0 parts per 100 parts of water.

References Cited

UNITED STATES PATENTS

| | | | |
|---|---|---|---|
| 1,875,473 | 9/1932 | McKee | 71—2.5 |
| 2,248,400 | 7/1941 | Avery | 71—2.5 |
| 2,284,970 | 6/1942 | Avery | 71—2.4 |
| 3,129,529 | 1/1964 | Rumsey et al. | 71—2.7 |

JAMES O. THOMAS, JR., *Primary Examiner.*